May 15, 1945.                J. S. PECKER                2,376,271
                          CATALYTIC CONVERTER
                          Filed Nov. 12, 1942
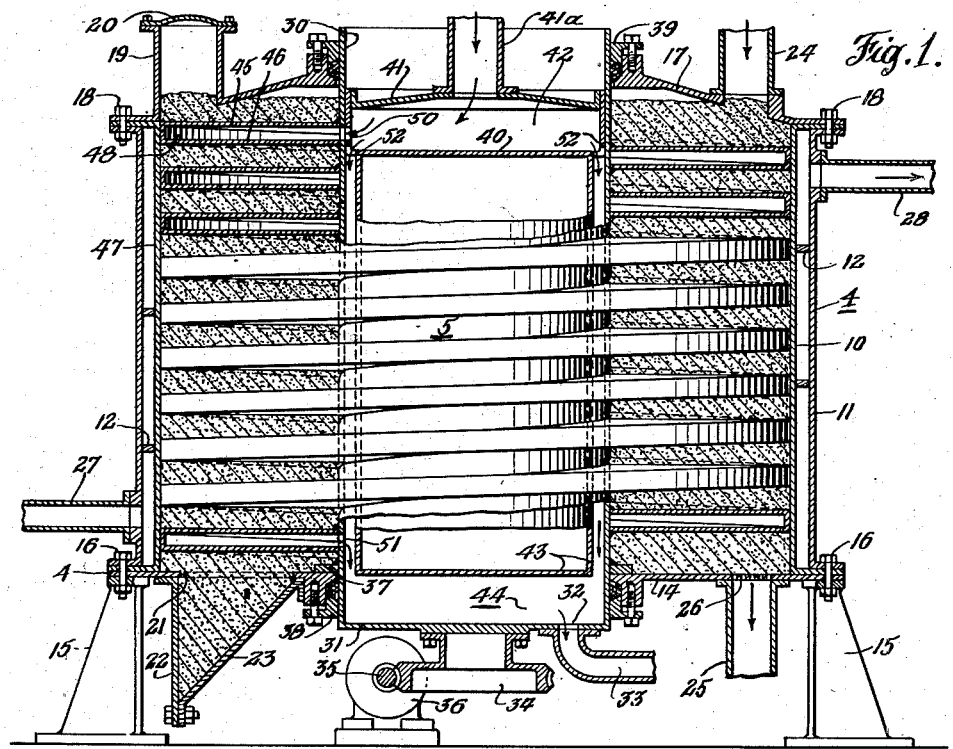

Patented May 15, 1945

2,376,271

UNITED STATES PATENT OFFICE 2,376,271

CATALYTIC CONVERTER

Joseph S. Pecker, Philadelphia, Pa., assignor to Machine & Tool Designing Co., Philadelphia, Pa., a corporation of Pennsylvania Application November 12, 1942, Serial No. 465,395

8 Claims. (Cl. 23—288)

This invention relates to fluid converters and in particular to the provision of a new and improved fluid converter embodying extreme compactness and efficiency in operation and which, in addition, is provided with new and improved means for containing catalyst material, for conveniently loading the converter with catalyst material, and for ejecting spent or impaired catalyst material from the converter.

Formerly, in converters of this general type wherein fluid is subjected to chemical reaction in the presence of a catalyst, especially with application of heat, great difficulty was encountered in securing efficient, uniform heating of the catalyst material as a whole, and the necessary intimacy of contact between the reaction fluid and the catalyst. Likewise, in many cases, renewal of the catalyst material necessitated substantial disassembly of the converter at great cost of labor, time and inconvenience.

It is the object of this invention totally to obviate the above disadvantages by the provision of a new and improved converter incorporating a heat transfer unit cooperating with the housing or casing of the converter to form a catalyst chamber for supporting catalyst material in such manner that it shall be uniformly and efficiently heated; wherein the reaction fluid shall be brought into uniform, intimate contact with the heated catalyst material; and wherein the heat transfer unit is movable within the housing or casing to facilitate loading of the catalyst chamber and ejection of catalyst material therefrom.

These and other objects and advantages of the invention will appear from the following description taken in conjuction with the accompanying drawing which forms a part thereof, and will be pointed out in the appended claims.

In the drawing:

Fig. 1 is a view partly in elevation and partly in section of a fluid converter constructed according to this invention;

Fig. 2 is a top plan view of the structure shown in Fig. 1, a portion of the housing and heat transfer unit being broken away in the interest of clearness; and Fig. 3 is a view in elevation, at reduced scale, of the heat transfer unit or element.

The converter of this invention is of the general type wherein fluid is subjected to chemical reaction in the presence of a catalyst, with optional application of heat. In previously known converters, it was difficult to secure uniform temperature throughout the mass of catalyst contained in the converter and, also, to secure the ultimate and desirable intimacy of contact between the heated catalyst and incoming reaction fluids. Furthermore, when the catalyst material became exhausted it was a matter of extreme difficulty to replace this material since it was necessary completely to tear down the converter, remove the spent caatalyst material, replace the spent catalyst material with new catalyst material and then reassemble the converter.

Furthermore, by their nature, these prior converters were of huge dimensions since the reaction fluid travelled in a generally straight path despite deflection by baffles sometimes placed in the reaction chambers.

All of the above disadvantages of prior art converters are obviated according to this invention by providing a converter comprising generally a housing (generally designated 4) with a heating jacket, a heat transfer member in the form of a hollow worm (generally designated 5) rotatably supported in the housing and forming therewith a spiral reaction chamber for supporting the catalyst material, the housing being provided with a fluid inlet admitting reaction fluid to the reaction chamber and an outlet being provided for the reaction products after their passage through the spiral reaction chamber.

An inlet port is provided for insertion of catalyst material into the reaction chamber, and an outlet port is also provided for the removal of catalyst material from the reaction chamber. In order to recharge the reaction chamber with catalyst material, it is merely necessary to open the catalyst material outlet port, rotate the worm within the casing positively to eject the catalyst material therefrom, and then to insert new catalyst material through the catalyst material inlet port into the reaction chamber while rotating the worm element to distribute it properly therein. The spiral heat chamber in the hollow worm is connected with a source of heat energy at one end and with a heat outlet at the other end whereby the temperature in the reaction chamber (formed between adjacent pitches of the worm) is maintained at a constant, predetermined temperature in conjunction with the heating function of the heating jacket of the housing, which heating jacket is likewise connected to a source of heat energy and provided with a heat outlet for the same purpose.

Referring to the drawing in detail, the housing 4 comprises an annular inner wall 10 and similar, spaced outer wall 11, maintained in predetermined spaced relation by suitable spacing elements 12. The lower end of the space within the inner annular wall 10 is closed by the bottom plate 14 which is supported on suitable leg members 15 and which is secured to the lower flanges of the annular walls 10 and 11 by means of bolts 16, or other suitable means.

The upper end of the space within the inner annular wall 10 is closed by the top plate 17, which is secured to upper end flanges of the inner wall 10 and outer wall 11 by bolts 18, or other suitable means.

At one side the top plate 17 is provided with the upright catalyst material inlet port 19, having a suitable detachable closure 20. In substantial alignment with this inlet port 19 is a catalyst outlet port 21 provided in the bottom plate 14. This opening 21 is provided with a suitable detachable closure comprising, for instance, the fixed wall 22 and removable wall 23, which may be removed to connect the outlet port 21 with the atmosphere.

The top plate 17 is also provided with a reaction fluid inlet 24 connected to a suitable source of reaction fluid and communicating with the upper end of the reaction chamber. The bottom plate 14 is provided with the reaction fluid outlet 25 substantially aligned with the fluid inlet 24 and leading to any suitable collecting chamber or station. Optionally, a suitable filter or baffle 26 is provided between the lower end of the reaction chamber and the reaction fluid outlet, as shown in Fig. 1.

A heat inlet 27 leads from any suitable source of heat energy through the outer annular wall 11 into the lower end of the heating jacket of the housing, and a heat outlet 28 leads through the outer annular wall 11 from the upper end of the housing heating jacket to any suitable collecting station.

The heat transfer member 5 includes a substantially cylindrical wall 30 closed at its lower end by a circular bottom plate 31 secured thereto in any suitable manner, as, for instance, by welding. This circular bottom plate 31 is provided with an aperture 32 which communicates with the heat outlet 33, which outlet 33 may be connected to any suitable heat energy collecting station. Also attached to the circular bottom plate 31 is the gear 34 which meshes with worm 35 driven by motor 36 to rotate the bottom plate 31, wall 30 and attached parts. The cylindrical wall 30 is supported in the casing for rotary motion by means of a thrust flange 37 welded or otherwise rigidly secured thereto and resting upon the lip of the central aperture provided in the bottom plate 14 of the housing for its accommodation. Adjacent this lip is a suitable fluid-tight gland 38. The upper end of the wall 30 passes through a similar aperture in the top plate 17 of the housing and the lip of this aperture is provided with a fluid-tight gland 39 similar to the above-described fluid-tight gland 38.

A cup-shaped wall 40 is secured in predetermined location adjacent the upper end of the cylindrical wall 30, and the upper end of this cup-shaped wall 40 is closed by the heat inlet chamber top plate 41 having a central aperture communicating with the heat inlet 41a, which heat inlet is connected to any suitable source of heat energy.

The space between the cup-shaped wall 40 and the top plate 41 forms the heat inlet chamber 42 of the heat exchange member. Depending from the cup-shaped wall 40 is a closed end cylindrical member 43 which blocks off the main portion of the interior of the chamber formed by the wall 30, wall 40 and bottom plate 31 to form the heat jacket generally designated 44.

About the cylindrical wall 30 are superposed, predeterminedly spaced, upper and lower spiral walls 45 and 46 having their inner edges welded or otherwise fixedly secured to the cylindrical wall 30 and having their outer edges joined by the spiral wall 47, suitably rigidly secured thereto or formed integrally therewith. In the modified form of Fig. 3, two such convolutions are provided on the worm to form spiral heating jackets at each side of the spiral reaction chambers defined by the spaces therebetween.

Leading from the heat inlet chamber 42 into the upper end of the spiral heating chamber 48, which is defined by the wall 30, spiral walls 45 and 46 and outer wall 47, is an inlet aperture 50 by means of which heat energy passes from the heat inlet chamber 42 into the spiral heat exchange chamber 48 and thence through this chamber to the outlet aperture 51, which communicates with the lower end of the heat jacket 44 of the heat exchange member, passing thence through aperture 32 and heat outlet 33.

The heat jacket 44 formed by the cylindrical wall 30 and closed cylindrical member 43 is heated also by heat energy passing from the heat inlet chamber 42 through apertures 52 into the space therebetween. This heat energy passes downwardly to the lower end of chamber 44 and thence through aperture 32 to the heat outlet 33.

Thus, heat energy is introduced into the housing heating jacket between walls 10 and 11 through inlet 27, whence it passes through the jacket and out through heat outlet 28 to heat the annular outer wall portion of the housing. Heat energy is also introduced through the heat inlet 41a into the heat inlet chamber 42, whence it passes through the apertures 50 into the spiral heat exchange chambers 48 and thence through these chambers through the apertures 51 into the lower end of the heat exchange jacket 44. Heat energy also passes from the heat inlet chamber 42 through apertures 52 into the jacket 44, this heat energy heating the cylindrical wall 30. The walls 45, 46 and 47 are heated by the heat energy passing through the spiral heat exchange chambers 48, and the inner annular wall 10 of the housing is heated by the heat energy passing through the housing heat jacket. Since the spiral reaction chambers are formed by the walls 30, 45, 46 and 10, each wall of these reaction chambers is effectively heated and, by controlling the temperature within the jackets and heat exchange chambers, the temperature of the catalyst material in the reaction chambers may be likewise closely controlled.

As stated above, catalyst material is introduced through the inlet 19 and distributed effectively and uniformly throughout the reaction chambers by rotation of the hollow worm, spent catalyst material being removed by opening the aperture 21 and rotating the worm for positively ejecting the spent catalyst material.

After the reaction chambers have been charged with catalyst material, heat energy is introduced into the heat inlet chamber 42 and the housing jacket to bring this catalyst material to the desired temperature, at which temperature it is maintained so long as is desired. Thereafter, reaction fluid is introduced through the reaction fluid inlet 24 into the upper ends of the spiral reaction chambers through which it passes in spiral paths to the lower ends, passing thence through filter or baffle 26 and reaction fluid outlet 25 to a suitable collection station.

During this time the motor 36 is de-energized and the hollow worm heat exchange member is stationary. The heat inlet which leads to the heat inlet chamber 42 is connected to a suitable source of heat energy, and the heat outlet 33 is connected to a suitable heat energy collecting station while the converter is thus in operation. Whenever it is desired to recharge the reaction chambers, as pointed out above, these connections are broken in order that the hollow worm heat exchange member may rotate as a unit during recharging of the reaction chambers. After the recharging operation has been completed, these connections are again made, to place the converter in operative condition.

While converters constructed according to my invention are suitable for use in the accomplishment of various processes wherein a reaction is secured by subjecting a reaction fluid at desired temperature and pressure to a given catalyst material at predetermined temperature for a predetermined time, it is particularly suitable for the production of butadiene from ethyl alcohol introduced at substantially catalyst temperature and at a desired pressure to any suitable catalyst, the ethyl alcohol breaking down into butadiene, water vapor and hydrogen.

While no pressure regulating means has been shown in connection with this disclosure, it is, of course, to be understood that any suitable, known means may be used for this purpose.

From the above description it will clearly appear that the heat exchange member 5 cooperates with the converter housing 4 to form a plurality of spiral reaction chambers for containing catalyst material in spiral layers of uniform thickness and of length many times the major dimension of the housing. Since the reaction fluid is guided lengthwise of this spiral layer from end to end, ultimate intimacy of contact between the reaction fluid passing through the converter (whether liquid or gas) is secured.

Likewise, the hollow spaces in the convolutions of the hollow worm heat exchange member form heat jackets of length coextensive with the length of the reaction chambers and with commensurate surface areas whereby to secure extreme thermal efficiency in heating the catalyst material. These heating jackets function with the jacket 44 and the housing heat jacket (between walls 10 and 11) effectively and efficiently to heat each wall of the reaction chambers and the catalyst material contained therein.

Furthermore, during recharging of the converter the rotatable heat exchange member functions as a screw feed, positively to eject spent catalyst material from the converter and/or to distribute newly introduced catalyst material uniformly throughout the spiral reaction chambers fully to fill them and to form therein masses of catalyst material of uniform density throughout, thus effectively preventing blocking or clogging of the reaction chambers and consequent obstruction of reaction fluid flow.

It is, of course, to be understood that the above description is merely illustrative and in no wise limiting and that I desire to comprehend within my invention such modifications as are embraced within the scope of the appended claims.

Having thus fully described my invention, what I claim as new and desire to secure by Letters Patent is:

1. In a catalytic converter, a housing and a heat transfer member comprising a hollow worm member supported therein and cooperating with said housing to form a spiral catalyst material containing reaction chamber, means for applying a heat transfer medium for circulation through said hollow worm member, the pitch of said worm member being reduced to a minimum and the blades being spaced a minimum distance from each other whereby a minimum distance results between adjacent blades of the worm member, and means for rotating said worm member.

2. In a catalytic converter, a housing, means forming a heat transfer member comprising a hollow worm structure rotatably supported in said housing and cooperating with said housing to form a spiral catalyst material containing reaction chamber, and means for rotating said heat transfer member with respect to said housing for positively ejecting catalyst material from said reaction chamber and feeding and uniformly distributing replacement catalyst material in said reaction chamber, the pitch of said hollow worm member being reduced to a minimum and the blades being spaced a minimum distance from each other whereby a minimum distance results between adjacent blades of the worm member.

3. In a catalytic converter, a housing having a cylindrical chamber therein, a heat transfer element in said chamber comprising a hollow worm member forming with said cylindrical chamber a spiral catalyst material containing reaction chamber, said hollow worm member being rotatable in said chamber for feeding and distributing catalyst material in said reaction chamber, and means for supplying a heat transfer medium to the interior of said hollow worm member for heating the catalyst material in said reaction chamber, the pitch of said worm member being reduced to a minimum and the blades being spaced a minimum distance from each other whereby a minimum distance results between adjacent blades of the worm member.

4. In a catalytic converter, a housing having a cllindrical chamber therein, a heat transfer element in said chamber comprising a hollow worm member forming with said cylindrical chamber a spiral catalyst material containing reaction chamber connected with a source of reaction fluid, said hollow worm member being rotatable in said chamber for feeding and distributing catalyst material in said reaction chamber, means for supplying a heat transfer medium to the interior of said hollow worm member for heating the catalyst material in said reaction chamber, and means for intermittently rotating said hollow worm member with respect to said housing for ejecting spent catalyst material from said reaction chamber and distributing replacement catalyst material therein, the pitch of said worm member being reduced to a minimum and the blades being spaced a minimum distance from each other whereby a minimum distance results between adjacent blades of the worm member.

5. In a catalytic converter, a housing and a heat transfer member comprising a multiple hollow worm member supported therein and cooperating with said housing to form a plurality of spiral catalyst material containing reaction chambers, means for rotating said hollow worm member, and means for supplying a heat transferring medium for circulation within said worm member for uniformly heating the catalyst in said spiral chambers of said worm member, the pitch of said worm members being reduced to a minimum and the blades being spaced a minimum distance from each other whereby a minimum distance results between adjacent blades of said hollow worm members.

6. In a catalytic converter, a housing having a cylindrical chamber therein, a heating jacket surrounding said cylindrical chamber, a heat transfer element in said chamber comprising a worm member forming with said cylindrical chamber a spiral catalyst material containing reaction chamber, said worm member having a hollow central portion and heat jacket means within said hollow central portion of said worm member cooperating with said first-named heat jacket for heating all sides of said reaction chamber, said hollow worm member having a reduced pitch and the blades being spaced a minimum distance from each other whereby a minimum distance results between adjacent blades of the worm member.

7. In a catalytic converter, a housing having a cylindrical chamber therein, a heat jacket surrounding said chamber, a heat transfer element in said chamber comprising a hollow worm member forming with said cylindrical chamber at least one spiral catalyst material containing reaction chamber, said hollow worm member having a hollow central portion and a heat jacket within said hollow central portion, means for supplying a heat transfer medium to said worm member and said heat jackets for heating the catalyst material in said reaction chamber, and said reaction chamber being connected at opposite ends with a source of reaction fluid and a reaction products collecting station, the pitch of said worm member being reduced to a minimum and the blades being spaced a minimum distance from each other whereby a minimum distance results between adjacent blades of the worm member.

8. In a catalytic converter, a housing having a chamber therein, a heat jacket surrounding said chamber, a heat transfer element in said chamber comprising a hollow worm forming with said cylindrical chamber a plurality of spiral catalyst material containing reaction chambers, opposite ends of said reaction chambers being connected with a source of reaction fluid and a reaction products collection station, means for supplying a heat transferring medium to said heat jacket and said heat transferring unit to heat the catalyst material in said reaction chambers, and means for intermittently rotating said hollow worm with respect to said housing for ejecting spent catalyst material from said reaction chambers and distributing replacement catalyst material therein.

JOSEPH S. PECKER.